United States Patent
Carson

(10) Patent No.: US 7,669,899 B2
(45) Date of Patent: Mar. 2, 2010

(54) PIPE TESTING TOOL WITH MAGNETIC CLAMPS

(75) Inventor: Glenn Carson, Point Edward (CA)

(73) Assignee: CAR-BER Investments Inc., Point Edward (CA)

( * ) Notice: Subject to any disclaimer, the term of this patent is extended or adjusted under 35 U.S.C. 154(b) by 0 days.

(21) Appl. No.: 12/098,273

(22) Filed: Apr. 4, 2008

(65) Prior Publication Data

US 2008/0211228 A1 Sep. 4, 2008

Related U.S. Application Data

(63) Continuation of application No. PCT/CA2006/001641, filed on Oct. 6, 2006.

(60) Provisional application No. 60/723,915, filed on Oct. 6, 2005.

(51) Int. Cl.
*F16L 25/00* (2006.01)

(52) U.S. Cl. .......................... 285/9.1; 285/901; 138/89; 29/282

(58) Field of Classification Search .................. 285/9.1, 285/419, 373, 411, 412, 368; 138/89, 90, 138/91, 94; 29/282
See application file for complete search history.

(56) References Cited

U.S. PATENT DOCUMENTS

| | | | | |
|---|---|---|---|---|
| 608,613 A | * | 8/1898 | Linich | 285/337 |
| 1,855,494 A | * | 4/1932 | Sorensen | 277/614 |
| 2,289,164 A | * | 7/1942 | Arnold et al. | 285/238 |
| 2,793,057 A | * | 5/1957 | McGugin | 285/9.1 |
| 2,873,764 A | * | 2/1959 | Lombard et al. | 138/90 |
| 2,944,842 A | * | 7/1960 | Stiff | 285/368 |
| 3,181,895 A | * | 5/1965 | Cator | 285/1 |
| 3,549,178 A | * | 12/1970 | Flink | 285/187 |
| 3,594,893 A | * | 7/1971 | Kuypers | 228/173.2 |
| 3,730,317 A | | 5/1973 | Jaeschke | |
| 3,792,729 A | * | 2/1974 | Perry | 165/76 |
| 4,004,298 A | * | 1/1977 | Freed | 285/9.1 |
| 4,336,959 A | * | 6/1982 | Roche | 285/368 |
| 4,372,587 A | * | 2/1983 | Roche | 285/238 |

(Continued)

FOREIGN PATENT DOCUMENTS

WO WO2000/17619 A1 3/2000

(Continued)

OTHER PUBLICATIONS

Supplementary European Search Report issued on Jun. 2, 2009 in corresponding European application No. 06 79 0801.

*Primary Examiner*—David E Bochna
(74) *Attorney, Agent, or Firm*—Santosh K. Chari; Blake, Cassels & Graydon

(57) ABSTRACT

An apparatus for sealing a section of a pipe interior includes a clamp having a magnetic engagement means for axially positioning the clamp within the interior of a pipe and preventing relative axial movement there-between and a sealing plate securable thereto. Movement of the sealing plate against the clamp results in deformation of a resilient sealing member thereby forming a seal between the apparatus and the pipe. The apparatus can be used in conjunction with another oppositely oriented apparatus or other sealing means to form a sealed space within the tube. Pressurization of the sealed space allows for a radial and/or axial force being applied to the sealed section of the pipe.

22 Claims, 6 Drawing Sheets

U.S. PATENT DOCUMENTS

| | | | |
|---|---|---|---|
| 4,635,970 A * | 1/1987 | Haines | 285/114 |
| 5,096,230 A * | 3/1992 | Pausch et al. | 285/9.1 |
| 5,190,324 A * | 3/1993 | Bird et al. | 285/328 |
| 5,419,354 A * | 5/1995 | Krynicki | 285/9.1 |
| 5,844,127 A | 12/1998 | Berube et al. | |
| 6,022,454 A * | 2/2000 | Fetzer | 202/242 |
| 6,065,784 A * | 5/2000 | Lundstrom | 285/368 |
| 6,131,441 A | 10/2000 | Berube et al. | |
| 6,463,791 B1 | 10/2002 | Berube et al. | |
| 6,467,811 B2 * | 10/2002 | Mitchell | 285/15 |
| 6,601,437 B2 | 8/2003 | Gotowik | |
| 7,104,881 B1 * | 9/2006 | Hyslop | 285/9.1 |
| 2008/0209986 A1 * | 9/2008 | Carson | 138/89 |

FOREIGN PATENT DOCUMENTS

WO     WO2006/069446 A1     7/2006

\* cited by examiner

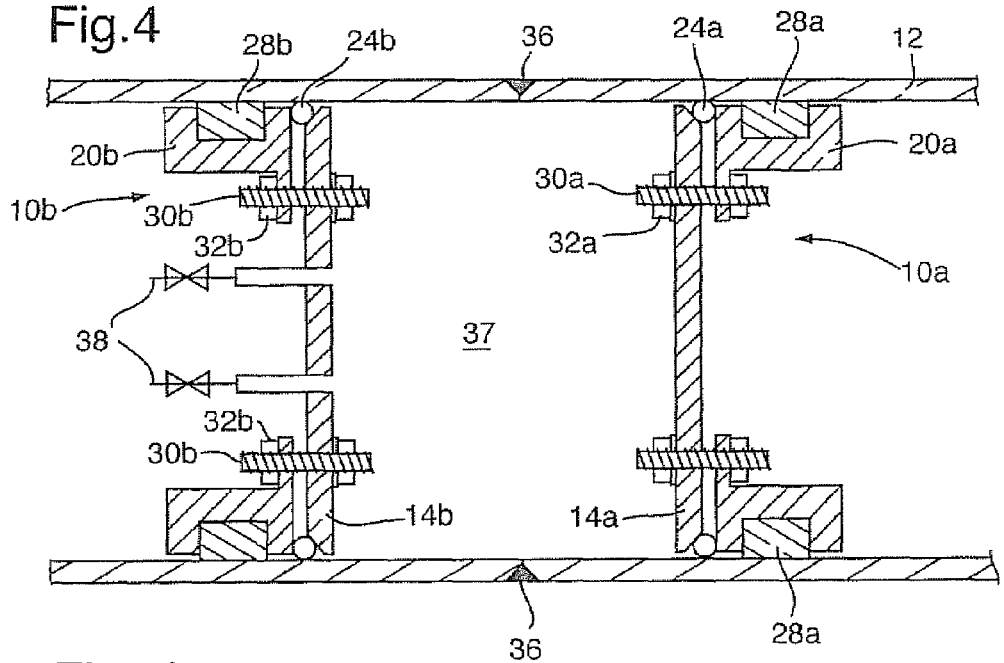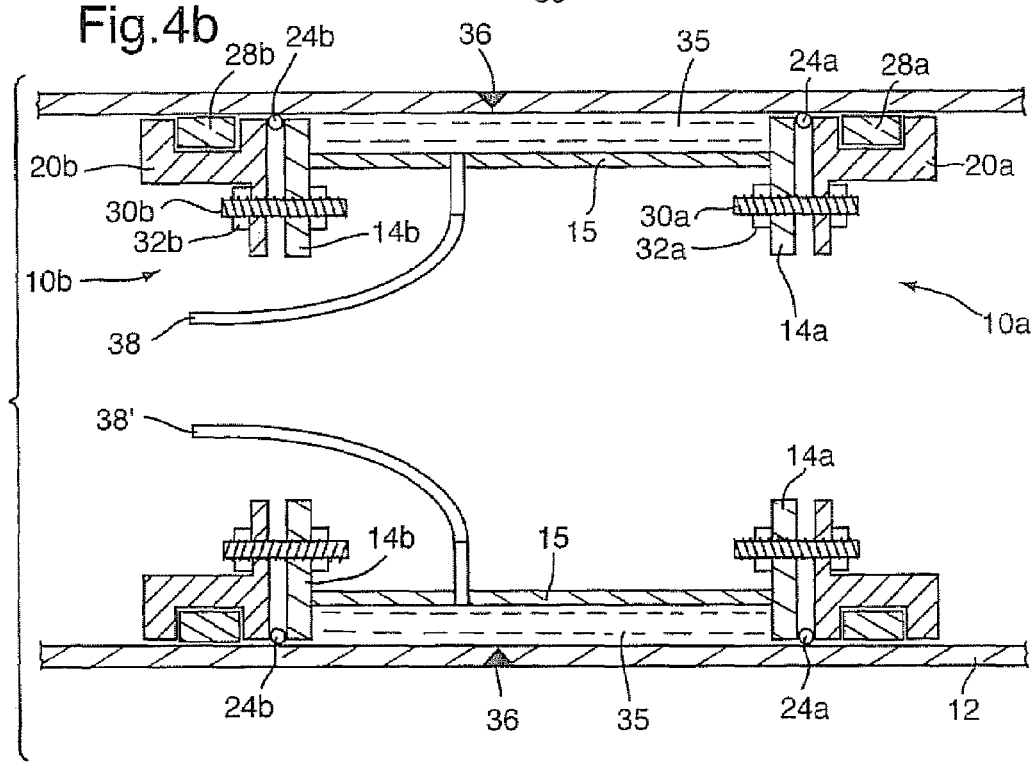

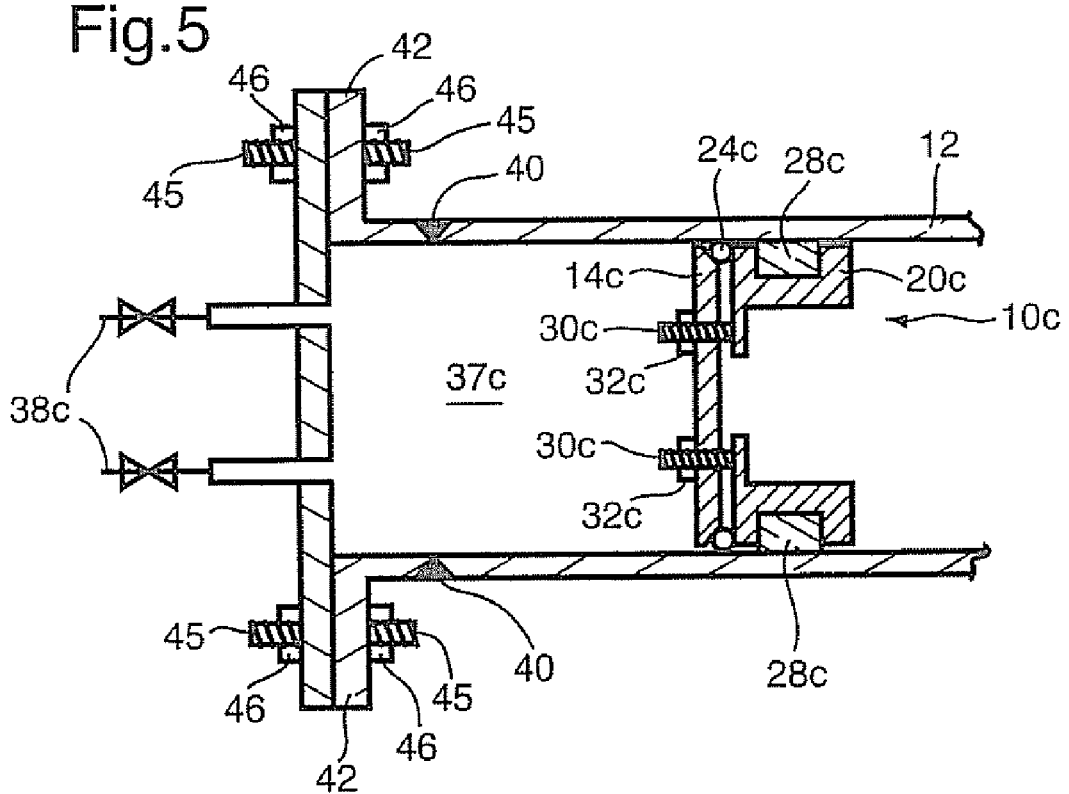
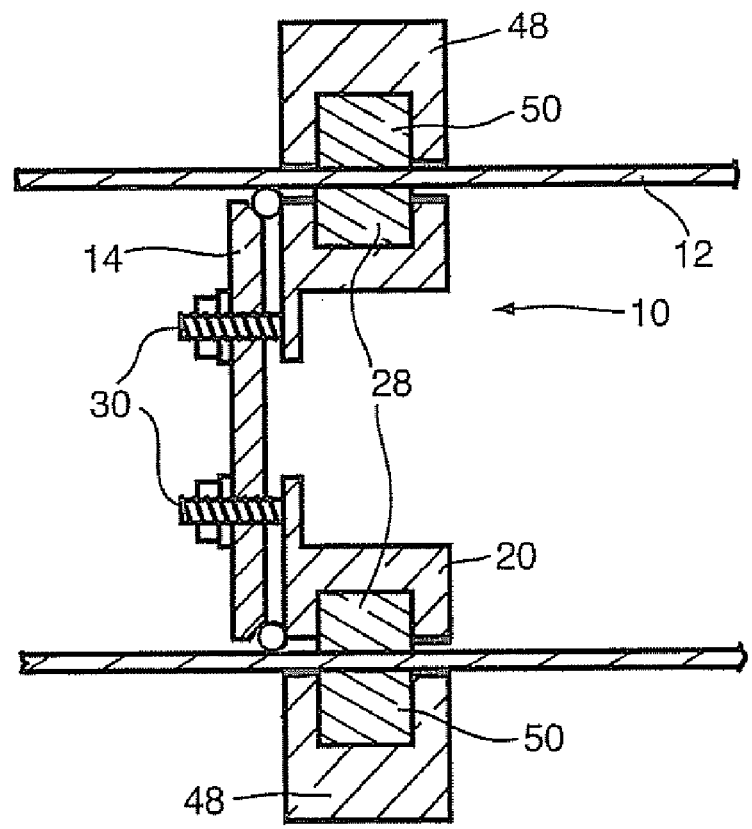

PIPE TESTING TOOL WITH MAGNETIC CLAMPS

CROSS REFERENCE TO PRIOR APPLICATIONS

This application is a Continuation of PCT application number PCT/CA2006/001641 filed on Oct. 6, 2006, which claims priority from U.S. Provisional application number 60/723,915, filed Oct. 6, 2005. The entire contents of all such applications are incorporated herein by reference.

BACKGROUND OF THE INVENTION

1. Field of the Invention

The present invention relates to an apparatus for testing welds on pipes and vessels and the like and, more particularly, an apparatus that internally seals sections of a pipe for conducting such tests. The invention also relates to an apparatus that both seals and tests a pipe.

2. Description of the Prior Art

In chemical or petrochemical plants etc., it is often necessary to convey fluidic materials (e.g. liquids) from one location to another. The conveyance of such material normally includes equipment such as conduits or pipes, storage or reaction vessels etc., which are generally manufactured from metal. The joining of separate pieces of the conveying equipment is generally achieved by welding the necessary pieces together. For example, when joining adjacent ends of pipe together, it is common for each end to be provided with flanges, that are welded to each respective end, which are then bolted together to form a seal. Such flanges may also be provided on holding tanks and other such vessels so that such vessels can be connected to pipes or other vessels. Alternatively, the connections between lengths of pipe or other equipment may be welded directly together (i.e. butt welded) to form the seal. In either case, it will be appreciated that each welded Joint or section must form a complete seal so as to prevent leakage of the materials being transported. This is particularly the case when handling potentially hazardous materials such as flammable or toxic liquids.

For reasons of safety, it is often necessary to periodically test the integrity of the welds used in Joining the various pieces of equipment (such as pipes, vessels, flanges and the like) together.

The prior art provides various tools for conducting weld integrity tests on conduits. For example, U.S. Pat. Nos. 6,131,441 and 5,844,127 (the entire disclosures of which are incorporated herein by reference) teach weld testing tools that isolate a particular section of a pipe (such section including a weld) and subject the section to a high pressure fluid within a constrained annular space defined by the tool and the inner surface of the pipe. The pressure of the fluid within the annular space is monitored whereby any pressure drop signifies a leak in the weld.

U.S. Pat. No. 6,463,791 (the entire disclosure of which is incorporated herein by reference) teaches an apparatus for testing welds used to secure nozzles. As shown in FIG. 1 of this reference, the apparatus comprises a first seal plate that is placed on the inner surface of the vessel (for example) and a second seal plate that is secured to the outer, flange portion of the nozzle. In this manner, the nozzle volume is sealed and a pressurizing fluid is introduced therein. Once the volume is filled, the pressure is monitored as above and any leakage detected. Although this apparatus provides an accurate and efficient means of testing welds on nozzles, the size and weight of the apparatus makes it inconvenient for use on large nozzles.

Further, applicant's co-pending U.S. application Ser. Nos. 60/640,093 and 60/663,871 (the entire disclosures of which are incorporated herein by reference) provide tools for testing the integrity of welds on pipes and the like.

There exists a need for more easily sealing a section of a long pipe for conducting the type of stress tests mentioned above. In addition, there exists a need for an apparatus that is capable of exerting axial stresses on welds during such testing so as to simulate a "worst case scenario".

SUMMARY OF THE INVENTION

In one aspect, the present invention generally provides an apparatus for internally sealing a section of a pipe wherein an integrity test of a weld can be conducted.

In a further aspect, the invention provides an apparatus that is capable of conducting a stress test on a weld while simultaneously sealing the section to be tested.

In yet a further aspect, the invention provides an apparatus that is capable of creating an axial stress on a section of a pipe.

In a further aspect, the invention provides an apparatus for insertion within a pipe, the apparatus comprising:

a circumferential clamp for engaging the inner surface of the pipe;

a sealing plate securable to the clamp, the plate having an outer diameter less than the inner diameter of the pipe;

the clamp comprising one or more first electro magnets for forming a magnetic attraction force between the clamp and the inner surface of the pipe thereby preventing relative movement between the pipe and the clamp;

a power source for activating the magnets;

a means for forcing the sealing plate towards the clamp; and a resilient seal, provided between the plate and the clamp, for forming a sealing engagement between the apparatus and the pipe inner wall upon the plate being moved towards the clamp.

In another aspect, the invention provides an apparatus for frictionally engaging the outer surface of a pipe comprising:

a generally annular shaped clamp adapted to fit over the outer surface of the pipe;

the clamp including one or more electromagnets for forming a frictional engagement with the surface of the pipe;

a power source for activating the electromagnets.

In a further aspect, the invention provides a method for sealing a section of a pipe comprising:

providing an apparatus within the pipe, the apparatus including:
  a) a magnetically activated clamp;
  b) a sealing plate;
  c) a resilient sealing member between the clamp and the plate, the sealing member being capable of radially outward deformation;

activating magnets on the clamp to prevent relative movement between the clamp and the pipe; and advancing the plate towards the clamp to thereby deform the resilient sealing member and to form a seal with the inner surface of the pipe.

In another aspect, the invention provides an assembly for sealing an internal section of a pipe, said apparatus comprising:

a pair of apparatuses positioned axially spaced apart within said pipe, each of said apparatus comprising:
  a) a circumferential clamp for engaging the inner surface of the pipe;

b) a sealing plate securable to the clamp, said plate having an outer diameter less than the inner diameter of the pipe;

c) said clamp comprising one or more first electro magnets for forming a magnetic attraction force between the clamp and the inner surface of the pipe thereby preventing relative movement between said pipe and said clamp;

d) a power source for activating said magnets;

e) a means for forcing said sealing plate towards said clamp; and f) a resilient sealing member, provided between said plate and said clamp, for forming a sealing engagement between said apparatus and said pipe inner wall upon said plate being moved towards said clamp.

BRIEF DESCRIPTION OF THE DRAWINGS

These and other features of the invention will become more apparent in the following detailed description in which reference is made to the appended drawings wherein:

FIGS. 4, 4b, 5 and 6 are cross sectional views of further embodiments of the present invention.

DETAILED DESCRIPTION OF THE INVENTION

Throughout the description of the invention the following terms will be assumed to have the following associated meanings:

"Vessel"—will be understood to mean any equipment or apparatus to which a nozzle is attached. As such, the term "vessel" will include vessels per se, pipes, drums, and any other similar equipment. It will be understood that the term "vessel" is used herein simply as a convenient way to encompass all such equipment or apparatus.

"Annular"—this term is used to describe a body having at least one outer diameter and at least one inner diameter. Thus, an "annular tube" will be assumed to be a hollow tube with an inner and outer diameter. An "annular disc" will be assumed to be an object having an outer diameter and a central aperture thereby providing an inner diameter.

"Axial"—this term will be used to describe a direction taken along the longitudinal axis of a pipe or conduit. Thus, "axial force" or "axial stress" will be understood as being a force applied in a direction parallel to the longitudinal axis of the conduit.

Figure 1:
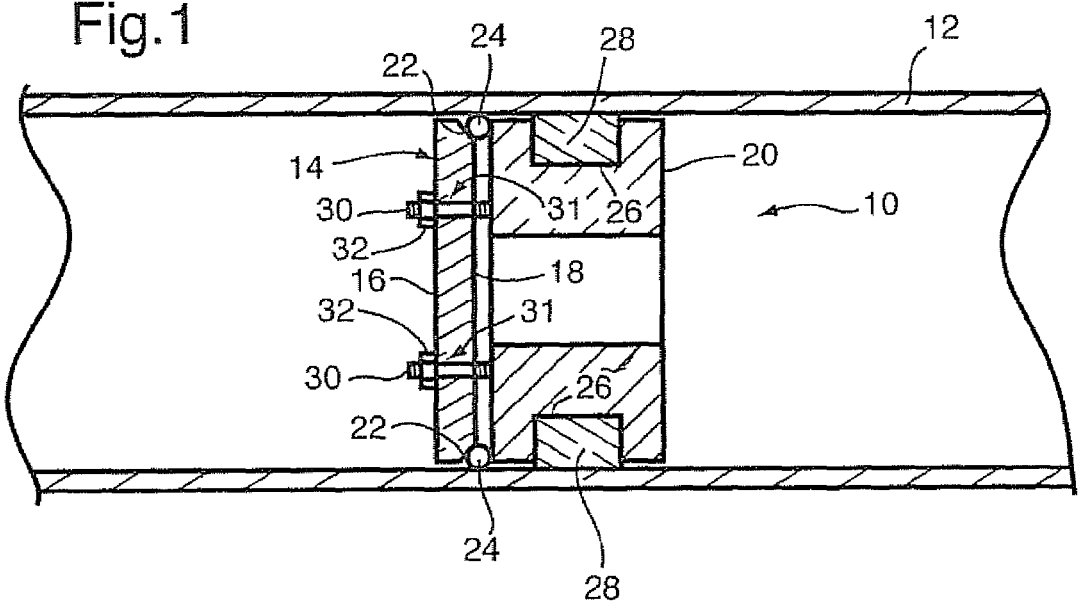
FIG. 1 is a cross sectional view of one embodiment of the apparatus of the present invention.

FIG. 1 illustrates one aspect of the invention wherein an internal sealing apparatus for a pipe is shown. The sealing apparatus 10 is preferably sized to fit within the lumen of a pipe (or tube) 12. The apparatus 10 comprises a sealing plate 14 having a diameter slightly less than the internal diameter of the pipe 12. The plate includes a first face 16 and a second face 18, wherein the second face is adjacent a clamp 20. The second face 18 of the sealing plate 14 is provided with beveled edge 22 for accommodating an O-ring 24 or other such resilient sealing means.

The clamp 20 generally comprises an annular ring having an outer diameter sized to fit within the pipe 12. An annular shape for the clamp 20 is preferred to minimize its weight. However, the clamp 20 may also comprise a solid body. As will be understood by persons skilled in the art having reviewed the present disclosure, the outer diameter of the clamp 20 is preferably slightly less than the internal diameter of the pipe 12 so as to permit axial placement of the clamp 20. The clamp 20 is provided with one or more recesses or pockets 26 into which are placed magnets 28. Preferably, the magnets 28 comprise electromagnets that can be activated when desired.

The magnets 28 provided on the clamp 20 are designed to magnetically attract the wall of the pipe 12, which, as is commonly known in the art, is formed from a ferrous metal. The magnets 28 are designed to form a strong clamping force with the interior wall of the pipe 12 and, thereby, to anchor the clamp in a fixed axial position within the pipe 12. In a preferred embodiment, at least two or more magnets 28 are provided on the clamp 20 with such magnets being placed circumferentially around the annular clamp 20. Such an arrangement will serve to evenly secure the clamp 20 within the pipe 12. Although the present description refers to a number of magnets being provided on the clamp, in other embodiments, one or more shaped magnets can be provided so as to achieve the desired clamping force.

The clamp 20 is releasably secured to the sealing plate 14. In one embodiment, the clamp is provided with one or more, and preferably a plurality, of bolts 30 adapted to be inserted into holes 31 provided on the seating plate. Nuts 32 cooperate with the bolts 30 to secure the sealing plate 14 to the clamp 20. It will be understood that a sealing means (not shown) may be provided between the bolts 30 and the nuts 32 and/or holes 31 in the sealing plate 14 to provide a seal and, thereby, prevent leaks through the holes 31.

Figure 2:
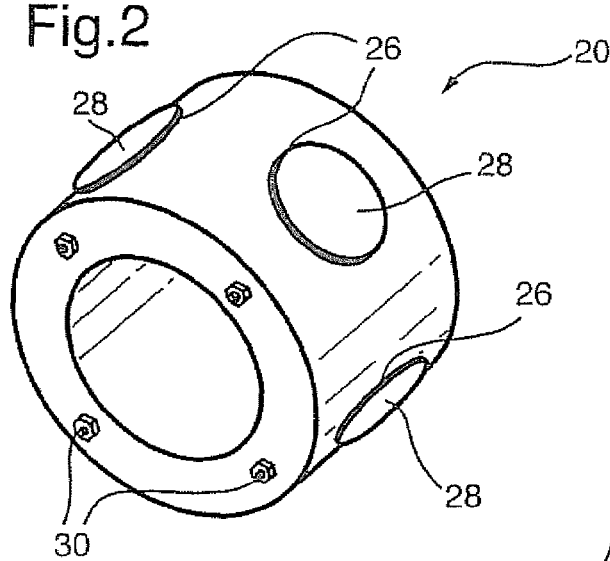
FIG. 2 is a perspective view of the clamp of the apparatus of FIG. 1.

FIG. 2 illustrates an embodiment of the clamp 20 illustrating the circumferential placement of the magnets 28 and the bolts 30. As mentioned above, although the clamp 20 is shown in FIG. 2 in the form of an annulus, it may also comprise a solid body. In either embodiment case, in order to reduce the weight of the clamp 20, it may be formed of a light material such as aluminum. The sealing plate 14 may also be formed of aluminum. However, it will be understood that the choice of material for the clamp 20 and/or the sealing plate 14 may be chosen from a variety of others.

As can be seen in FIG. 1, upon tightening of the nuts 32, the sealing plate 14 is forced against the opposing face of the clamp 20. In the course of this process, the resilient seal 24 (i.e. the O-ring) is elastically deformed. The bevel 22 provided on the sealing plate 14 causes such deformation to expand radially outwardly.

In use, the apparatus 10 is first inserted within a pipe 12. The apparatus 10 is axially positioned in a desired location within the pipe 12. It will be understood that the apparatus may be preassembled prior to the positioning step. That is, the sealing plate 14 may be loosely connected to the clamp 20. Alternatively, the sealing plate 14 and clamp 20 may be inserted separately within the pipe 12. Once the apparatus 10 is positioned at the desired location, the sealing plate 14 is connected to the clamp 20 (if not already) by first inserting the bolts 30 through the holes 31 and attaching the cooperating nuts 32 thereto. As mentioned above, any type of seal (such as washers, packing etc.) may also be provided so as to seal the holes 31. Tightening of the nuts 32 forces the sealing plate 14 against the clamp 20 and, as discussed above, results in the outward radial deformation of the seal 24. The seal 24 is thereby forced against the inner wall of the pipe 12 resulting in a pressure resistant seal there-between.

Either before the tightening of the nuts 32 or after, the magnets 28 provided on the clamp 20 are activated resulting in a strong attraction force being formed between the magnets 28 and the wall of the pipe 12. It will be understood that the magnets used in the invention are chosen so as to provide the required clamping force to prevent axial movement of the clamp 20 within the pipe 12. As mentioned above, the magnets 28 preferably comprise electro magnets. In such case, one or more power supply units (not shown) will be connected to the magnets 28 in order to activate same.

Once the clamp 20 is secured to the pipe 12 and the sealing plate 14 is secured and sealed against the clamp 20, the lumen of the pipe 12 facing the first face 16 of the sealing plate may then be pressurized with a gas or liquid without leakage beyond the sealing plate 14.

Figure 3:
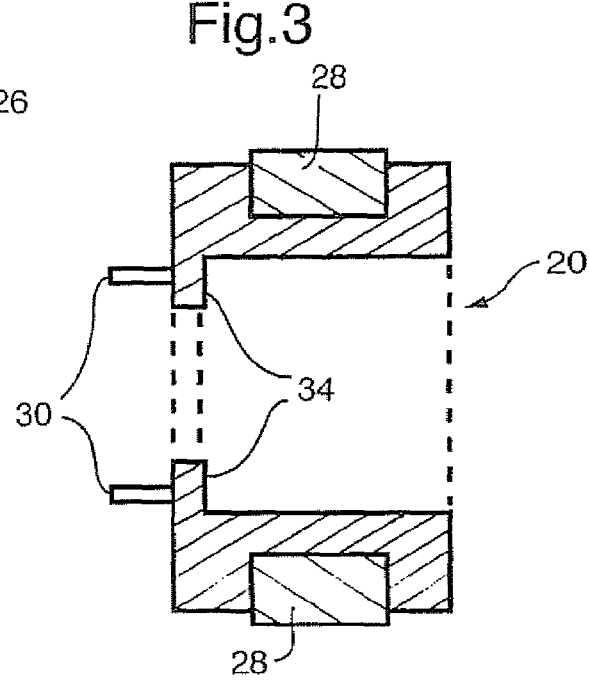
FIG. 3 is a cross sectional elevation of another embodiment of the clamp of FIG. 1.

FIG. 3 illustrates another embodiment of the clamp 20 having an annular structure wherein an inwardly extending flange 34 is provided to accommodate the bolts 30. The bolts may be permanently attached to the flange 34 (or the face of the clamp 20) by means of welds etc., may be integrally formed therewith, or may extend there-through and be secured with nuts (not shown).

FIG. 4 illustrates the use of the sealing apparatus of the invention for the dual purposes of sealing and testing a pipe. As shown, a pair of apparatuses 10a and 10b is provided within a pipe 12 and positioned on opposite sides of a weld 36, the integrity of which is to be tested. Apparatus 10a is essentially identical to that shown in FIG. 1 and as described above. As discussed above, apparatus 10a includes a sealing plate 14a joined to a clamps 20a by means of nuts and bolts 32a and 30a, respectively. Clamp 20a includes at least one magnet 28a, and preferably two or more magnets generally circumferentially equidistantly spaced. A seal is formed between the apparatus 10a and the inner wall of the pipe 12 by means of a resilient seal 24a, which may comprise an O-ring. The magnets 28a are activated to secure the clamp to the pipe 12 at the desired location. As explained above, such securing results when the attraction force of the magnets creates a tight friction engagement between the magnet and the pipe 12 surface.

Apparatus 10b of FIG. 4 is similar to the apparatus 10a described above and similar elements are identified with similar reference numerals but with the letter "b" added for clarity. As shown, apparatus 10b is positioned within the pipe 12 on the opposite side of the weld 36 from apparatus 10a. In this manner, the two apparatuses 10a and 10b combine to seal off a section of the pipe 12 thereby forming a sealed space 37. In the case of apparatus 10b, the sealing plate 14b is provided with at least one fluid port 38 through which the sealed space 37 can be filled with a pressurizing fluid (i.e. a liquid or a gas). In a preferred embodiment, as illustrated in FIG. 4, two ports 38 are provided so that one is used to fill the space 37, for example with water, while the other is used to vent any air there-within. It will be appreciated that any number of ports 38 can be provided. One or more of the ports 38 is preferably connected to a pressure gauge or other similar device (not shown) to monitor the pressure created within the space 37. As will be known to persons skilled in the art, a test of the weld 36 involves applying a constant high pressure to the interior of the pipe and monitoring such pressure over a period of time. Any drop in pressure signifies a leak in the weld.

In use, the system illustrated in FIG. 4 first involves placing and securing the apparatuses 10a and 10b in the manner described above. The sealed space 37 is then filled with a pressurizing fluid and, as described above, the pressure is monitored.

Apart from the testing function provided by the system shown in FIG. 4, a further feature of the invention will also be understood. Specifically, by creating a sealed pressurized space 37 between the apparatuses 10a and 10b, it will be seen that the pressure applied to the weld 36 also provided a separating force between the two apparatuses. However, since the apparatuses are secured, or clamped, to the interior of the pipe, such separating force also serves to apply an axial force against the weld 36. In this way, the system shown in FIG. 4 applies both radial and axial forces against the weld 36 thereby more accurately simulating a "worst case" scenario for conducting the weld test. It will be understood that such simulated stresses will provide more accurate results for the test.

FIG. 4b illustrates a variation of the assembly shown in FIG. 4. In the case of FIG. 4b, the apparatus 10a and 10b are essentially the same as that discussed above in that each includes at least one clamp 20a and 20b, respectively, which are provided within a pipe 12. Clamps 20a and 20b include magnets 28a and 28b arranged in the same manner as described above. The main difference between the assembly shown in FIGS. 4 and 4b lies in the sealing plates 14a and 14b. In the case of FIG. 4b, the sealing plates 14a and 14b are general of an annular disc shape, wherein each includes a generally central opening. As will be appreciated by persons skilled in the art, this allows the plates 14a and 14b to be of much reduced weight thereby facilitating use of the assembly in large diameter pipes.

In addition, the sealing plates 14a and 14b of FIG. 4b are joined together by a tube 15 extending between each plate. The tube 15 includes an inner diameter that is preferably larger than the diameters of the openings provided in plates 14a and 14b. Further, the outer diameter of the tube 15 is less than the inner diameter of the pipe 12. When the assembly of apparatuses 10a and 10b is installed within a pipe 12, a sealed annular space 35 is thus formed between the two seals 24a and 24b, the outer surface of the tube 15 and the inner surface of the pipe 12. The tube 15 is also preferably provided with one or more ports as discussed above. In FIG. 4b, two ports, 38 and 38' are shown. Tie ports are used to fill and/or vent the annular space 35 in the same manner as described above. As can be seen, the volume of the space 35 is minimized due to the presence of the tube 15 and, therefore, the volume of fluid required to fill the space is minimized.

FIG. 5 illustrates the use of a sealing apparatus of the invention in a manner similar to that shown in FIG. 4. In the example illustrated in FIG. 5, a weld 40 is used to secure a flange 42 to the end of a pipe 12. It will be understood that pipe 12 may be a pipe used for conveying as described above or may be the conduit portion of a nozzle provided on a vessel and the like. In this example, an apparatus 10c essentially the same as that shown in FIG. 1 is used to seal the pipe 12 on one side of a weld 40 opposite to the flange 42. In FIG. 5, the elements of apparatus 10c that are similar to the apparatus of FIG. 1 are shown with the same reference numerals but with the letter "c" added for clarity. The method of positioning and sealing the apparatus 10c is the same as described above. In this example, the open end of the flange 42 is sealed with a plate 44. The plate 44 is formed with a series of circumferentially spaced bolt holes that correspond with bolt holes that are normally present on the face of the flange 42. Once the bolt holes of the plate 44 are aligned with those of the flange 42, bolts 45 are inserted there-through and secured with nuts 46. As shown in FIG. 5, nuts may be provided on both ends of the bolts 45. It will be understood that the bolts 45 may have one end with an integral or welded bolt head thereby avoiding the need for nuts on both ends thereof. It will be understood that any needed seal such as a gasket and the like (not shown) may be provided at the junction of the faces of the flange 42 and plate 44.

The plate 44 is provided with at least one port 38c in a manner similar to that described above with reference to FIG. 4. The ports 38c serve to fill the sealed space 37c between the flange 42 and the sealing apparatus 11c. As shown in FIG. 5, the sealed space 37c includes the weld 40 that secures the flange 42 to the end of the pipe 12.

In using the system shown in FIG. 5, the sealing apparatus 10c is first installed within the pipe 12 in the manner described above. The plate 44 is then installed at the outer face of the flange 42. The plate 44 is secured to the flange 42 so as to form a pressure tight seal there-between. As mentioned above, any needed gaskets etc. can be used for this purpose. Once the plate 44 and the apparatus 10c are secured and clamped, a pressurized fluid is injected through one or more of the ports 38c so as to pressurize the space 37c. As discussed above with respect to FIG. 4, the apparatus shown in FIG. 5 also serves to apply both a radial as well as axial stress on the weld 40.

FIG. 6 illustrates a further embodiment of the invention wherein the apparatus 10 of FIG. 1 is provided within a pipe 12. However, in this example, the exterior surface of the pipe is provided with a retaining collar 48 comprising a generally annular body having an inner and outer diameter. The inner diameter of the collar 48 is provided with a number of circumferentially spaced magnets 50 designed to abut the outer surface of the pipe 12. The magnets 50 of the collar 48 are arranged so as to overlap magnets 28 provided on the clamp 20 when tile collar 48 is positioned in the same axial position as the clamp 20. The magnets 50 of the collar 48 may be provided with a different power source or the same as that powering magnets 28 of the clamp 20.

With the embodiment of FIG. 6, it will be understood that the combination of the magnetic attraction forces of both sets of magnets 28 and 50 will serve to provide an enhanced clamping force for the apparatus. In other words, the collar 48 serves to reinforce the clamp 20. In a further embodiment, the polarity of the magnets 28 and 50 can be adjusted so as to form a magnetic attraction force there-between. In this manner, the combination of the clamp 20 and collar 50 can be used with non-ferrous pipes as well such as pipes made from aluminum or stainless steel etc. In such case, it will be understood that the magnets 28 and 50 will be provided with a pipe contact surface having a sufficient coefficient of friction to prevent the apparatus from sliding over the pipe 12. Similarly, even in the case of ferrous pipes, such a friction surface may be provided on the magnets 28 and/or 50.

It will be understood that the collar 48 may be used with any of the clamps discussed above.

Figure 7:
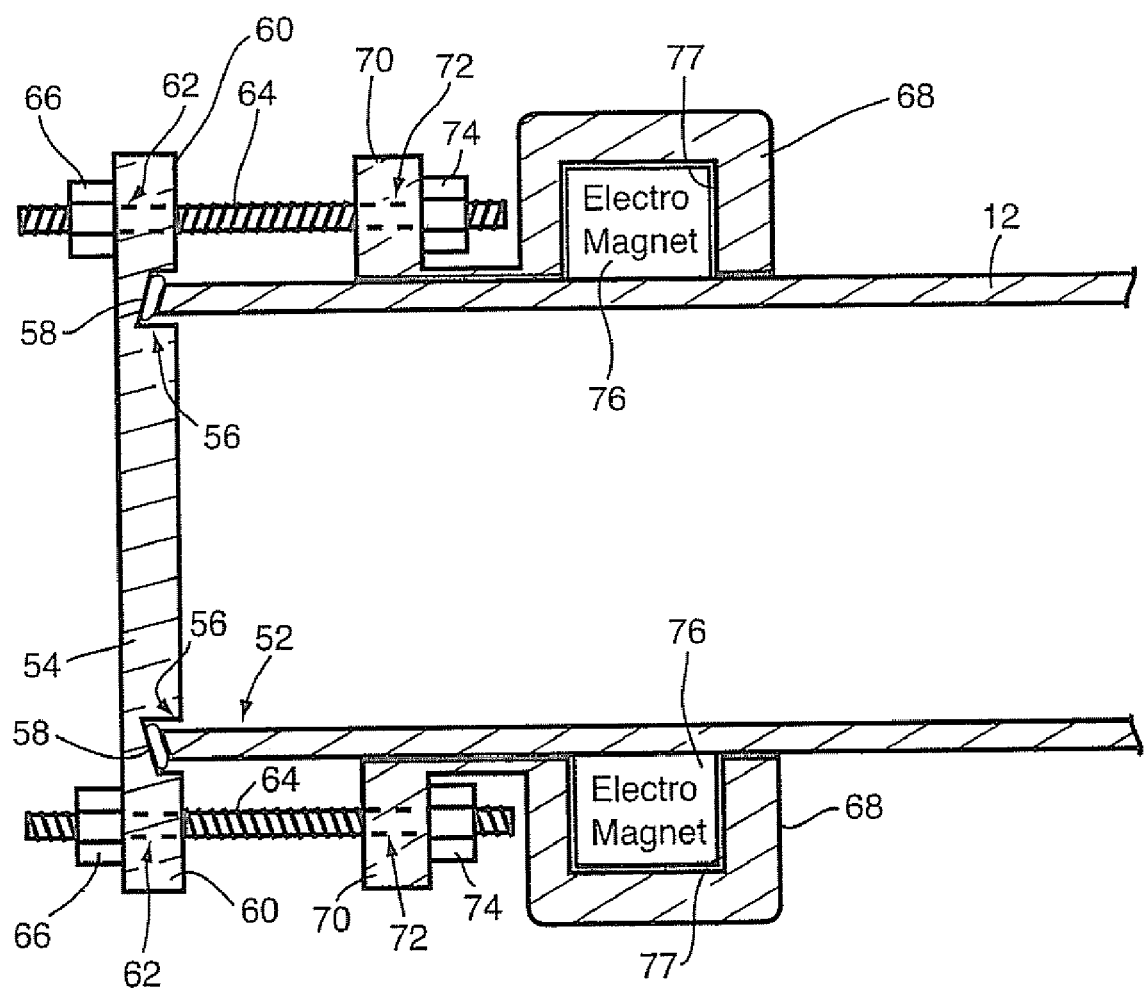
FIGS. 7 to 9 are cross sectional views of an embodiment of the invention having an external clamp.

FIG. 7 illustrates a further embodiment of the invention for sealing an end of a pipe. As shown a pipe 12 having an open end 52 is provided with an end plate 54 adapted to close the open end. The end plate 54 is preferably provided with a circular race 56 for receiving therein the end 52 of the pipe 12. As will be understood, the width of the race 56 will Generally be sized to accommodate the thickness of the pipe 12. The race 56 is also preferably provided with a resilient sealing member 58 so as to form a seal between the plate 54 and the end 52 of the pipe 12.

The plate 54 is provided with diameter greater than that of the pipe 12 so as to form a radially extending anchoring flange 60. In another embodiment, the plate 54 may have a diameter closer to that of the pipe 12 but be provided with radially extending arms to form an equivalent to the anchoring flange 60.

The anchoring flange 60 is provided with a plurality of circumferentially spaced bolt holes 62 through which are passed bolts 64. On the face of plate 54 opposite the pipe end 52, the bolts 64 are secured with nuts 66. The opposite ends of the bolts 64 are secured to a clamping collar 68 comprising a generally annular body circumferentially extending around the external surface of the pipe 12. The clamping collar 68 includes a radially outwardly extending flange 70 facing the plate 54. The flange 70 is provided with a plurality of bolt holes 72 corresponding to the bolt holes 62 on the plate 54 and adapted to receive the opposite ends of the bolts 64. The flange 70 is secured to the bolts 64 with nuts 74. In another embodiment, it will be understood that the bolts 64 can be welded or formed with either the plate 54 or the flange 70 thereby requiring only one set of nuts 66 or 74.

The clamping collar 68 is provided with one or more magnets 76 circumferentially around the inner diameter thereof and directed towards the outer surface of the pipe 12. The magnets 76 are provided within recesses or pockets 77 provided in the body of the collar 68. As discussed above, the magnets 76 may preferably comprise electro magnets coupled to one or more power sources (not shown). In a preferred embodiment, a plurality of magnets 76 are provided generally equidistantly around the circumference of the pipe 12 so as to evenly distribute the associated clamping forces.

In another embodiment, the clamping collar 68 may be provided in one or more sections.

In operation, the clamping collar 68 is mounted on the outer surface of the pipe 12. At this time, the magnets 76 may be activated so as to form a magnetic attraction force between the magnets and ferrous pipe 12. The strength of the magnets will be chosen so as to form an adequate clamping force between the collar 68 and the pipe 12 so as to prevent relative axial movement there-between. As mentioned above, the magnets 76 may be provided with a friction enhancing surface to assist in preventing relative axial movement between the collar 68 and the pipe 12.

Once the clamping collar 68 is secured to the pipe 12 surface, the plate 54 is then mounted against the open end 52. The plate is mounted so that the end of the pipe 12 is received within the race 56. At this time, the bolts 64 are positioned and secured with bolts 66 and 74. As will be understood, tightening of the bolts results in the plate being forced against the open end 52 of the pipe 12 and, thereby, the end of the pipe being sealed.

Once the end of the pipe 12 is sealed with the plate 54, the interior of the pipe can then be pressurized to test, for example, any welds provided on the pipe.

Figure 8:
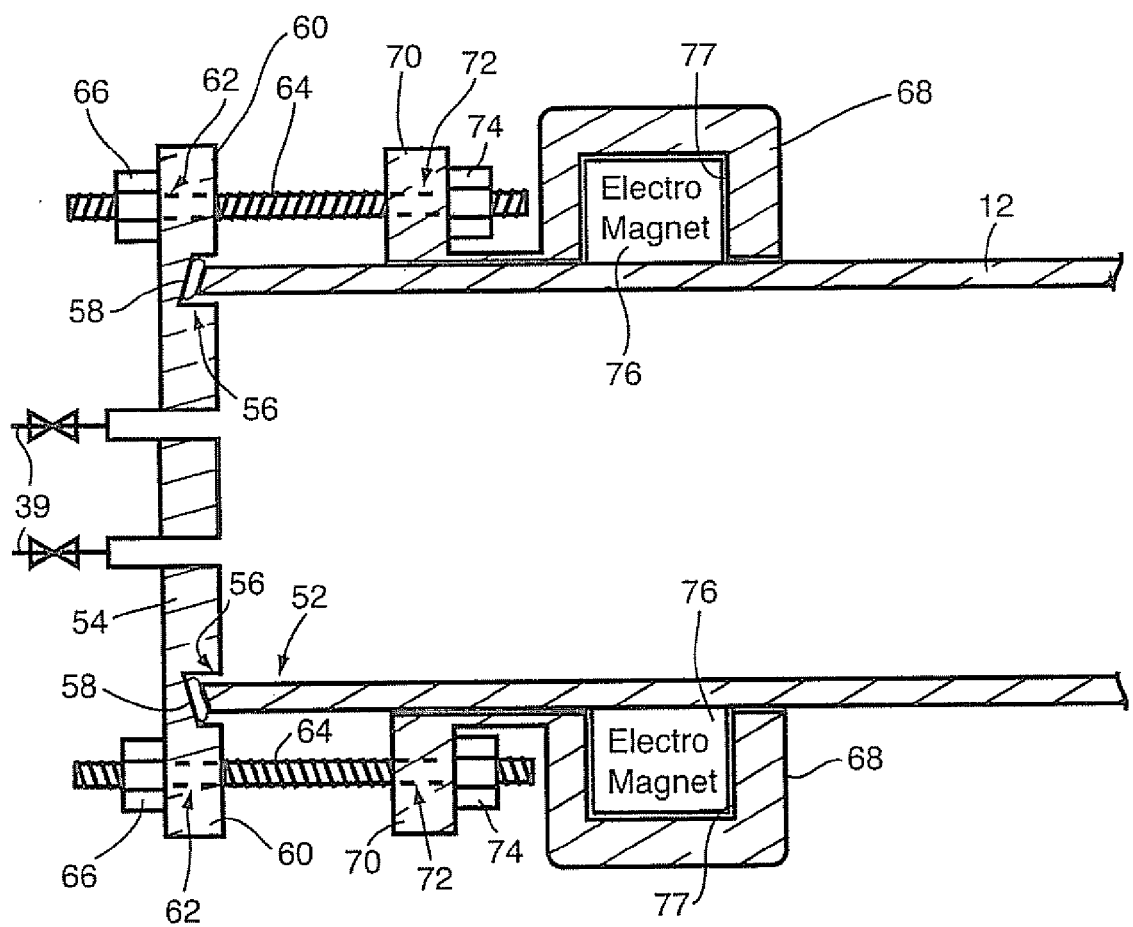

In a further embodiment, as shown in FIG. 8, the plate illustrated in FIG. 7 can be provided with ports 39, which are similar to those shown as element numbers 38c in FIG. 5. As will be understood, the apparatus shown in FIG. 8 can be used to pressurize the interior of the pipe 12 so as to apply a radial and axial stress therein. In this manner, a weld on the pipe, downstream of the end 52 may be tested with the apparatus of FIG. 8 without the need to localize the testing apparatus at the region of the weld. It will also be understood that the apparatus of FIG. 8 can used in combination with, for example, the sealing apparatus 10 or 10c of FIG. 1 or 5 so as to isolate a segment of a pipe for testing purposes.

Figure 9:
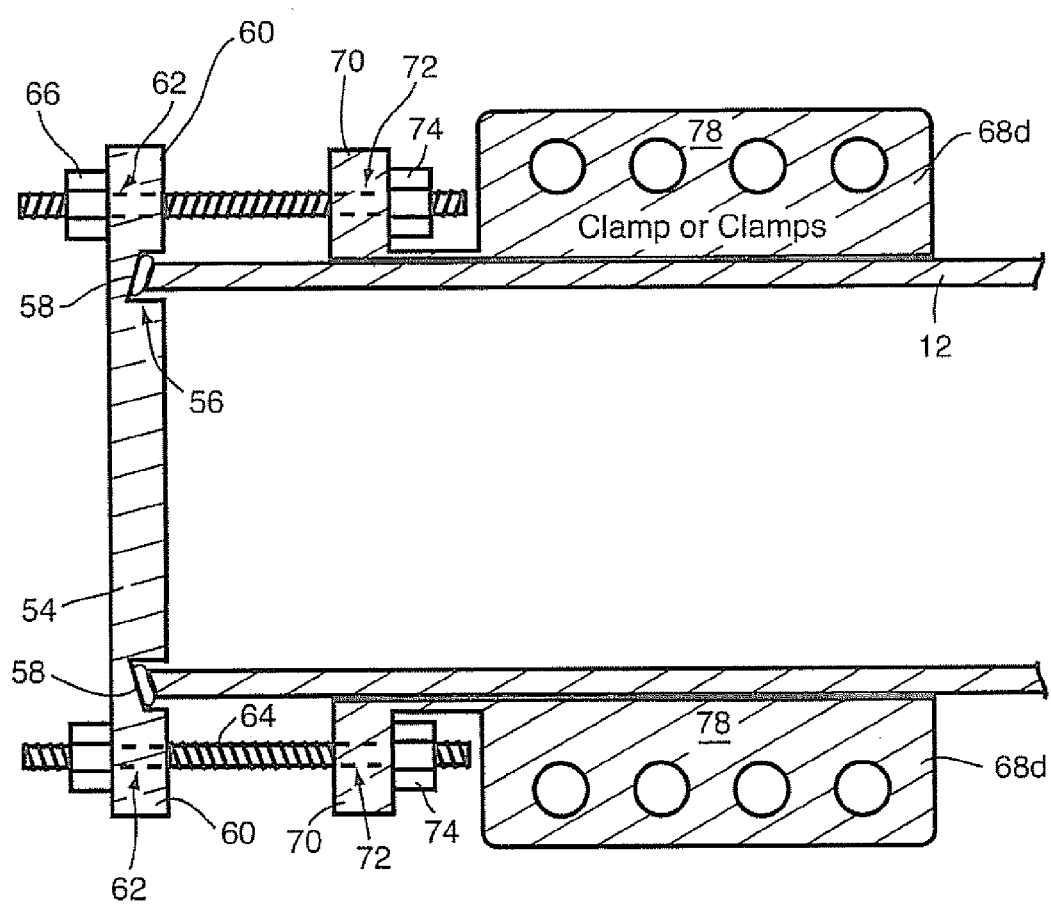

A further embodiment of the apparatus of FIGS. 7 and 8 is illustrated in FIG. 9 wherein like elements are indicated with like reference numerals. Elements that are similar but not identical are indicated with like reference numerals but with the letter "d" added for clarity. As can be seen, in the embodiment of FIG. 9, the clamping collar 68d does not include any magnets for engaging the wall of the pipe 12. In the example of FIG. 9, the clamping collar 68d is provided in two or more sections that are joined together by means of cooperating radially extending flanges 78. Each of the flanges 78 are provided with bolt holes 80 through which bolts are passed. Nuts provided on opposite sides of the flanges 78 serve to secure the flanges together. The clamping collar 68*d* of FIG. 9 is sized so that tightening of the flanges 78 to each other forms a strong frictional engagement with the outer surface of the pipe 12. Further description of such mechanical clamps is provided in applicant's co-pending U.S. application Ser. No. 60/663,871, the entire contents of which are incorporated herein by reference.

It will be understood that the above discussion has used Geometric terms such as annular, disc, circumference, etc., for ease of reference. However, these terms should not be construed as limiting the invention to any specific shape of nozzle or pipe and various modifications of the apparatus will be apparent to persons skilled in the art to adapt same to any shape or design.

Although the invention has been described with reference to certain specific embodiments, various modifications thereof will be apparent to those skilled in the art without departing from the spirit and scope of the invention as outlined in the claims appended hereto. The disclosures of all prior art recited above are incorporated herein by reference in their entirety.

We claim:

1. An apparatus for insertion within a pipe, said apparatus comprising:
    a circumferential clamp for engaging the inner surface of the pipe;
    a sealing plate securable to the clamp, said plate having an outer diameter less than the inner diameter of the pipe;
    said clamp comprising at least one first electro magnet for forming a magnetic attraction force between the clamp and the inner surface of the pipe thereby preventing relative movement between said pipe and said clamp;
    a power source for activating said at least one first magnets;
    a means for forcing said sealing plate towards said clamp; and
    a resilient sealing member, provided between said plate and said clamp, for forming a sealing engagement between said apparatus and said pipe inner wall upon said plate being moved towards said clamp.

2. The apparatus of claim 1 wherein said clamp comprises a generally annular shaped ring and wherein said at least one first magnets are provided on the outer surface thereof.

3. The apparatus of claim 2 wherein said clamp includes a plurality of said first magnets equidistantly spaced about the outer circumference of said clamp.

4. The apparatus of claim 1 wherein the means for forcing said sealing plate comprises at least two nut and bolt combinations.

5. The apparatus of claim 1 further comprising an outer reinforcing clamp adapted to be circumferentially provided on the outer surface of the pipe.

6. The apparatus of claim 5 wherein said reinforcing clamp comprises a generally annular shaped ring including at least one second magnet.

7. The apparatus of claim 6 wherein each of said at least one second magnets of the reinforcing clamp are positioned over the first magnets.

8. The apparatus of claim 7 wherein said first and second magnets are of opposite polarity whereby an attraction force is developed therebetween.

9. The apparatus of claim 1 wherein said sealing plate includes at least one port for communication with the interior of said pipe.

10. An apparatus for frictionally engaging the outer surface of a pipe and for sealing an end of the pipe, the apparatus comprising:
    a generally annular shaped clamp adapted to fit over the outer surface of the pipe;
    said clamp including a means for forming a frictional engagement with the surface of the pipe; and
    said apparatus further including a sealing plate securable to the clamp, said plate including a means for sealingly engaging an end of said pipe;
    wherein said means for forming a frictional engagement comprises at least one electromagnet provided on said clamp for magnetically engaging said pipe outer surface.

11. The apparatus of claim 10 further comprising a means for urging said plate against the end of the pipe.

12. The apparatus of claim 11 wherein said means for urging comprises at least two bolts and associated nuts extending between the clamp and the plate.

13. The apparatus of claim 12 wherein said plate includes a circular groove with a resilient sealing member for receiving the end of said pipe.

14. The apparatus of claim 10 wherein said plate includes at least one port extending into the pipe.

15. A method for sealing a section of a pipe comprising:
    providing an apparatus within said pipe, the apparatus including:
    a) a magnetically activated clamp;
    b) a sealing plate;
    c) a resilient sealing member between the clamp and the plate, said sealing member being capable of radially outward deformation;
    activating magnets on the clamp to prevent relative movement between the clamp and the pipe; and,
    advancing the plate towards the clamp to thereby deform the resilient sealing member and to form a seal with the inner surface of said pipe.

16. The method of claim 15 wherein a pair of said apparatuses is provided in an axially spaced manner within the pipe whereby said sealed section comprises a segment of the pipe between said apparatuses.

17. The method of claim 16 further comprising providing at least one port on at least one of said apparatuses to provide communication into said sealed section.

18. The method of claim 16 wherein a sealed annular space is formed between said pair of apparatuses.

19. An assembly for sealing an internal section of a pipe, said assembly comprising:
    a pair of apparatuses positioned axially spaced apart within said pipe, each of said apparatuses comprising:
    a) a circumferential clamp for engaging the inner surface of the pipe;
    b) a sealing plate securable to the clamp, said plate having an outer diameter less than the inner diameter of the pipe;
    c) said clamp comprising at least one first electro magnet for forming a magnetic attraction force between the clamp and the inner surface of the pipe thereby preventing relative movement between said pipe and said clamp;
    d) a power source for activating said magnets;
    e) a means for forcing said sealing plate towards said clamp; and
    f) a resilient sealing member, provided between said plate and said clamp, for forming a sealing engagement between said apparatus and said pipe inner wall upon said plate being moved towards said clamp.

20. The assembly of claim 19 wherein at least one of said plates includes at least one port extending into the pipe.

21. The assembly of claim 19 wherein said plates comprise annular discs.

22. The assembly of claim 21 wherein said discs include a tube extending therebetween, whereby, when the assembly is installed in a pipe, a sealed annular space is formed between the resilient sealing members, the inner surface of the pipe and the outer surface of the tube.

* * * * *